(12) United States Patent
Miyagawa

(10) Patent No.: US 10,777,889 B2
(45) Date of Patent: Sep. 15, 2020

(54) ARRAY ANTENNA

(71) Applicant: FURUNO ELECTRIC CO., LTD., Nishinomiya (JP)

(72) Inventor: Tetsuya Miyagawa, Nishinomiya (JP)

(73) Assignee: FURUNO ELECTRIC CO., LTD., Nishinomiya (JP)

( * ) Notice: Subject to any disclaimer, the term of this patent is extended or adjusted under 35 U.S.C. 154(b) by 334 days.

(21) Appl. No.: 15/900,418

(22) Filed: Feb. 20, 2018

(65) Prior Publication Data

US 2018/0175502 A1    Jun. 21, 2018

Related U.S. Application Data

(63) Continuation-in-part of application No. PCT/JP2016/069909, filed on Jul. 5, 2016.

(30) Foreign Application Priority Data

Aug. 20, 2015  (JP) .................................. 2015-162383

(51) Int. Cl.
| | |
|---|---|
| H01Q 3/36 | (2006.01) |
| H01Q 21/08 | (2006.01) |
| H01Q 21/00 | (2006.01) |
| G01S 7/28 | (2006.01) |
| H01Q 21/22 | (2006.01) |

(52) U.S. Cl.
CPC ............. *H01Q 3/36* (2013.01); *G01S 7/2813* (2013.01); *H01Q 21/0075* (2013.01); *H01Q 21/08* (2013.01); *H01Q 21/22* (2013.01)

(58) Field of Classification Search
CPC ...... H01Q 3/36; H01Q 21/0075; H01Q 21/08; H01Q 21/22
See application file for complete search history.

(56) References Cited

U.S. PATENT DOCUMENTS

| | | | |
|---|---|---|---|
| 2008/0136713 A1 | 6/2008 | Fu et al. | |
| 2009/0267822 A1* | 10/2009 | Shinoda | G01S 7/352 342/70 |
| 2012/0098726 A1* | 4/2012 | Gottl | H01Q 21/0006 343/824 |

FOREIGN PATENT DOCUMENTS

| | | |
|---|---|---|
| JP | H11-195924 A | 7/1999 |
| JP | 2000-040915 A | 2/2000 |

(Continued)

*Primary Examiner* — Marc Anthony Armand
(74) *Attorney, Agent, or Firm* — Xsensus LLP

(57) ABSTRACT

Provided is an array antenna capable of reducing side lobes while efficiently arranging antenna elements. The array antenna includes a substrate, a plurality of antenna elements, a primary feeder line, a plurality of secondary feeder lines, and a phase-inverter. The antenna elements is arrayed on the substrate in longitudinal directions thereof. The secondary feeder lines are connected to the respective antenna elements from one of the longitudinal directions of the substrate, and at least connected to the antenna elements that are disposed at both end portions of the substrate from a center side of the substrate. The phase-inverter is positioned where the connected direction of the secondary feeder line to the antenna element changes, disposed at least between the antenna elements adjacent to each other on a first end portion side of the longitudinal center of the substrate, and inverted the phase of a radio wave to be transmitted.

8 Claims, 4 Drawing Sheets

(56) References Cited

FOREIGN PATENT DOCUMENTS

| | | | |
|---|---|---|---|
| JP | 2005-340939 | A | 12/2005 |
| WO | WO 2006/132032 | A | 12/2006 |

* cited by examiner

ARRAY ANTENNA

CROSS REFERENCE TO RELATED APPLICATIONS

This application is a continuation-in-part application of International Application No. PCT/JP/2016/069909 filed on Jul. 5, 2016, and claims priority to Japanese Patent Application No. 2015-162383 filed on Aug. 20, 2015, the entire disclosure of each of which is hereby incorporated by reference.

TECHNICAL FIELD

The present disclosure mainly relates to an array antenna, which radiates radio waves from a plurality of arrayed antenna elements.

BACKGROUND

Conventionally, array antennas which include a substrate, antenna elements, and feeder lines are known. The substrate is a plate made of a dielectric material having a given size, and the antenna elements and the feeder lines are arranged on the substrate. The antenna elements are arranged in line in one direction (hereinafter, referred to as the array direction). The feeder lines supply to the antenna elements radio waves inputted from outside. Patent Documents 1 and 2 disclose such kind of array antennas.

In the array antenna of Patent Document 1, the feeder lines are connected to the antenna elements from the array direction (from the right side in FIG. 1). In Patent Document 1, the feeder lines are connected in the same direction to all the antenna elements.

In the array antenna of Patent Document 2, on a right side of the center of the substrate in longitudinal directions thereof, the feeder lines are connected to the antenna elements from the left side (center side). On the other hand, on the left side of the center of the substrate in the longitudinal directions, the feeder lines are connected to the antenna elements from the right side (center side).

REFERENCE DOCUMENTS OF CONVENTIONAL ART

Patent Documents

[Patent Document 1] JP1999-195924A
[Patent Document 2] JP4307324B

SUMMARY

In Patent Document 1, since the feeder line for the antenna element disposed at the right end is connected from a further right side, the area of the substrate is not effectively utilized to the full extent, resulting in less number of antenna element installations. In this regard, in Patent Document 2, since the antenna elements can be arranged at both ends of the substrate, even when using the substrate of the same size, the number of antenna element installations can be increased.

However, two feeder lines connected to the two antenna elements disposed at the center side are both connected from the center side in Patent Document 2, so as to shorten the distance between the two feeder lines. Since these two feeder lines are connected to the antenna elements in different directions (one from the left side and the other from the right side), disposition of a phase-inverter for inverting the phase by, for example, extending one of the feeder lines with respect to the other feeder line is needed.

In the case of disposing the phase-inverter between two feeder lines located close to each other, for example, one of the feeder lines needs to be curved greatly. However, when the feeder line is greatly curved, sidelobes easily occur. Particularly, since the power of radio wave is high at the center of the substrate, strong sidelobes easily occur.

The present disclosure is made in view of the above situations, and mainly aims to provide an array antenna which is capable of reducing sidelobes while efficiently arranging antenna elements.

The problems to be solved by the present disclosure are as described above, and measures to solve the problems and its effects are described as follows.

According to one aspect of the present disclosure, an array antenna of a center feed type having the following configuration may be provided. That is, the array antenna may include a substrate, a plurality of antenna elements, a primary feeder line, a plurality of secondary feeder lines, and a first phase-inverter. The plurality of antenna elements may be arrayed on the substrate in longitudinal direction. The plurality of secondary feeder lines may be arranged on the substrate, each secondary feeder line from the plurality of secondary feeder lines being connected between the primary feeder line and one antenna element from the plurality of antenna elements each secondary feeder line being connected to the plurality of antenna elements in the longitudinal direction, a secondary feeder line that connects to an antenna element positioned at an end portion of the substrate being connected to a face of the antenna element that faces a center of the substrate. The first phase-inverter may invert a phase of a radio wave transmitted to the plurality of antenna elements, the first phase-inverter may be positioned between two adjacent antenna elements from the plurality of antenna elements by connecting the secondary feeder lines of the two adjacent antenna elements to faces of the two adjacent antenna elements that face each other, the first phase-inverter may be off centered in the longitudinal direction.

Thus, since no feeder line may be positioned at the end portions of the substrate, the number of antenna element dispositions may be increased by effectively utilizing the size of the substrate. Further, since the first phase-inverter may be positioned off centered in the longitudinal direction, generation of sidelobes due to the phase-inverter may be reduced.

With the array antenna, when the substrate is evenly divided into four regions in the longitudinal directions, the first phase-inverter may be at least positioned in a first region of the four regions.

Thus, since the phase-inverter may be positioned near the end portion, the generation of sidelobes may further be reduced.

The array antenna may have the following configuration. That is, the array antenna may include a second phase-inverter. The second phase-inverter may invert a phase of a radio wave transmitted to the plurality of antenna elements, the second phase-inverter may be positioned between two adjacent antenna elements from the plurality of antenna elements by connecting the secondary feeder lines of the two adjacent antenna elements to faces of the two adjacent antenna elements that face each other, the second phase-inverter may be off centered in the longitudinal direction.

The second phase-inverter may be positioned in a second end region of the four regions different from the first end region.

The array antenna may have the following configuration. That is, the array antenna may include a third phase-inverter may invert a phase of a radio wave transmitted to the plurality of antenna elements. The third phase-inverter may be positioned between the first phase-inverter and the second phase-inverter.

Thus, at a position where the third phase-inverter is positioned, since the secondary feeder lines are connected from both outer sides of the adjacent two antenna elements, an interval between two feeder lines may be widened. Therefore, since the phase-inverter may be configured without greatly curving the feeder line, the generation of sidelobes may further be reduced.

With the array antenna, the third phase-inverter may be positioned between the antenna elements adjacent to each other across a center of the substrate.

Thus, since a switching position of connecting directions of the feeder lines may be at the center, unnecessary vertically-polarized waves may cancel each other out to some extent, which may lead to a quality improvement of the radio waves to be radiated.

With the array antenna, the third phase-inverter may be not curved.

Thus, the generation of sidelobes may further be reduced.

With the array antenna, the secondary feeder lines may be symmetric with respect to a line passing through a longitudinal center of the substrate as a symmetrical line.

Thus, the unnecessary vertically-polarized waves may cancel each other out, which may lead to the quality improvement of the radiated radio waves.

With the array antenna, the first phase-inverter may be positioned between adjacent antenna element positioned closest to an end of the substrate.

Thus, since the phase is inverted at the end portion where power is comparatively small, the generation of sidelobes may further be reduced.

DETAILED DESCRIPTION

Figure 1:
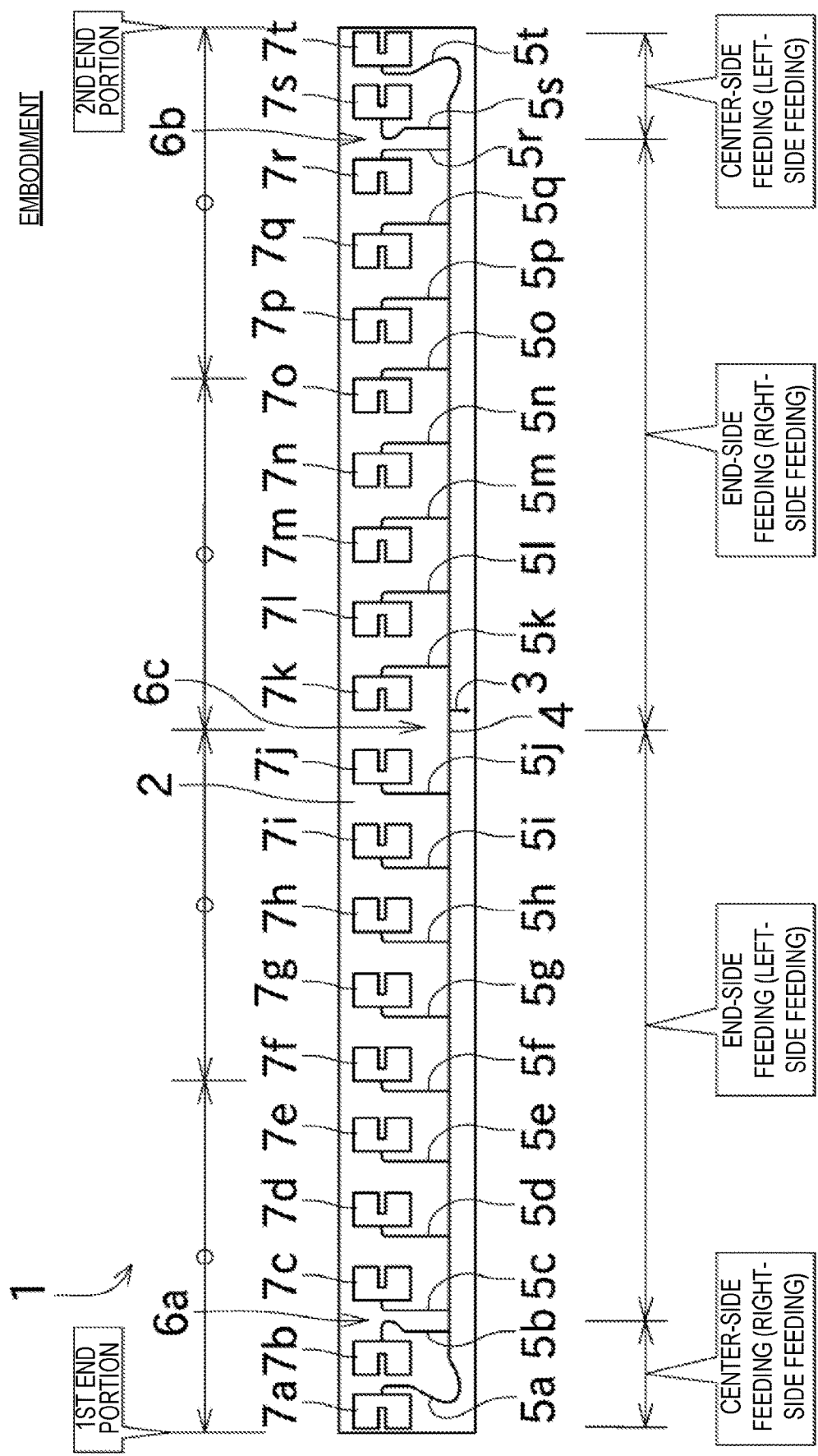
FIG. 1 is an elevational view of an array antenna according to one embodiment of the present disclosure.

Next, one embodiment of the present disclosure is described with reference to the appended drawings. First, an overview of an array antenna 1 according to one embodiment of the present disclosure will be described with reference to FIG. 1. FIG. 1 is an elevational view of the array antenna 1 according to the embodiment of the present disclosure.

The array antenna 1 may be used as a radar antenna of a radar apparatus disposed in a movable body (e.g., a ship) or a building etc. The array antenna 1 may radiate radio waves (signals) inputted from a signal generator (not illustrated) to the outside. Further, the array antenna 1 may receive reflections of radio waves radiated to the outside. Note that the array antenna 1 may be configured solely for transmission of radio waves.

As illustrated in FIG. 1, the array antenna 1 may include a substrate 2, a connecting line 3, a primary feeder line 4, secondary feeder lines 5a to 5t, phase-inverters 6a to 6c, and antenna elements 7a to 7t. Note that, although the connecting line 3, the primary feeder line 4, and the secondary feeder lines 5a to 5t are drawn by lines of the same thickness in FIG. 1, actually, transmission paths having the corresponding thickness to the characteristics etc. may be formed.

The substrate 2 may be made of a dielectric material and may be a rectangular plate in elevational view. The array antenna 1 may radiate the radio waves in a direction perpendicular to the substrate 2 (to the surface side of the sheet of FIG. 1).

The connecting line 3 may be an elongated member made of a conductive material. The connecting line 3 may receive a radio wave from the signal generator via, for example, a coaxial cable. The array antenna 1 of this embodiment may be a so-called center feed type antenna which is fed power from near the center of the substrate 2 in its longitudinal directions.

Note that, although in this embodiment, technically the connecting line 3 may deviate slightly to the right side of FIG. 1 from the center of the substrate 2 in the longitudinal directions, it may still correspond to the center feed type even with the deviation of such degree. For example, the connecting line 3 may be disposed between the secondary feeder line 5j and the secondary feeder line 5k arranged at the center side. Further in this embodiment, although the radio wave may be supplied from the back side of the sheet of FIG. 1 to the connecting line 3, the radio wave may be supplied to the connecting line 3 from another direction (e.g., a lower side).

The primary feeder line 4 may be an elongated member made of a conductive material. The primary feeder line 4 may be connected to the connecting line 3 and transmit the radio wave inputted via the connecting line 3 to the antenna elements 7a to 7t. The primary feeder line 4 may be substantially straight and arranged to extend in the longitudinal directions of the substrate 2 (in other words, the array direction of the antenna element 7a to 7t). Note that in the following description, the array direction of the antenna element 7a to 7t may simply be referred to as "array direction."

The secondary feeder lines 5a to 5t may be elongated members made of conductive materials. The secondary feeder lines 5a to 5t may respectively be connected to the primary feeder line 4. The secondary feeder lines 5a to 5t may branch the radio wave inputted via the primary feeder line 4 to the respective antenna elements 7a to 7t to transmit them to the antenna elements 7a to 7t.

Specifically, the secondary feeder lines 5a to 5t may extend in transverse directions of the substrate 2 from the connecting points with the primary feeder line 4, be curved substantially at right angles, and be connected to the antenna elements 7a to 7t in the longitudinal directions of the substrate 2 (array direction), respectively. Note that, which side of the ends of the antenna elements 7a to 7t (the right or left side in FIG. 1) the secondary feeder lines 5a to 5t are connected, respectively, will be described later.

The phase-inverting parts 6a to 6c may be parts which invert the phase of the radio wave to be supplied. In this embodiment, the phase-inverters 6a to 6c may be constructed by adjusting the length of the primary feeder line 4 and/or the secondary feeder lines 5a to 5t. Note that, the phase-inverters 6a to 6c may be separate members from the primary feeder line 4 and the secondary feeder lines 5a to 5t. Note that, details of the first phase-inverter 6a to the third phase-inverter 6c will be described later.

The antenna elements 7a to 7t may be substantially-rectangular members made of conductive materials. The antenna elements 7a to 7t may be arrayed in the same direction as the longitudinal directions of the substrate 2. In this embodiment, the antenna elements 7a to 7t may be connected to the secondary feeder lines 5a to 5t, respectively. With this configuration, the antenna elements 7a to 7t may be capable of radiating outside the radio waves generated by the signal generator.

Further, the intervals of arranging the antenna elements 7a to 7t may, in principle, be constant (equivalent to one wavelength of the radio wave to be radiated). Note that, since the antenna elements are arranged according to the size of the substrate 2, the interval between the antenna elements 7a and 7b and the interval between the antenna elements 7s and 7t may be shorter than the others. Therefore, the secondary feeder lines 5a and 5t may be curved so that the phases of the radio waves supplied to the adjacent antenna elements coincide with each other. Note that, the interval of arranging the antenna elements 7a to 7t is arbitrary, and it may not be constant as described in Patent Document 2, etc.

Next, the direction in which the secondary feeder lines 5a to 5t are connected to the antenna elements 7a to 7t, the arrangement of the phase-inverters 6a to 6c, etc. will be described. Note that, one end portion of the substrate 2 in the longitudinal directions may be referred to as the first end portion and the other end portion may be referred to as the second end portion.

As illustrated in FIG. 1, the secondary feeder lines 5a and 5b may feed power (be connected) to the antenna elements 7a and 7b from the center side of the substrate 2 (the right side in FIG. 1, the second end portion side). The secondary feeder lines 5c to 5j may feed power to the antenna elements 7c to 7j from an end side of the substrate 2 (the left side in FIG. 1, the first end portion side). The secondary feeder lines 5k to 5r may feed power to the antenna elements 7k to 7r from an end side of the substrate 2 (the right side in FIG. 1, the second end portion side). The secondary feeder lines 5s and 5t may feed power to the antenna elements 7s and 7t from the center side of the substrate 2 (the left side in FIG. 1, the first end portion side).

Thus, at least the antenna elements 7a and 7t arranged at the ends in the array direction may be fed power from the center side. As a result, no secondary feeder line may be disposed at the end portions of the substrate 2, which may allow an increase in the number of antenna element dispositions.

In addition, the secondary feeder lines 5a to 5t and the antenna elements 7a to 7t may be line-symmetric to each other with respect to a line passing through the center of the substrate 2 in the longitudinal directions as a symmetrical line. As a result, unnecessary vertically-polarized waves may cancel each other out, which may lead to a quality improvement of the radiated radio waves.

Next, the phase-inverters 6a to 6c will be described. Note that, disposing the phase-inverters 6a to 6c between given antenna elements may mean that the phase-inverters 6a to 6c are disposed on a line which electrically connects the antenna elements (secondary feeder line, primary feeder line).

The first phase-inverter 6a may be disposed between the antenna element 7b and the antenna element 7c (between the antenna elements adjacent to each other on the first end portion side of the longitudinal center of the substrate 2). Since the secondary feeder line 5b and the secondary feeder line 5c feed power in opposite directions, it may be necessary to invert the phase of the radio wave to be transmitted, in order to coincide the radio waves radiated from the antenna elements 7b and 7c. At the first phase-inverter 6a, the secondary feeder line 5b may be curved so that the path length to the antenna element 7b differs from the path length to the antenna element 7c by $\lambda/2$. Note that, there may be a possibility that curving the secondary feeder line 5b may cause sidelobes.

Here, since power of the radio waves radiated near the end portions of the substrate 2 may be smaller than those at the center portion, generation of sidelobes may be reduced. Therefore, as illustrated in FIG. 1, when the substrate 2 is evenly divided into four regions in the longitudinal directions, the first phase-inverter 6a may preferably be disposed in a region which includes the first end portion. The first phase-inverter 6a of this embodiment may be disposed in the region which includes the first end portion. Although in this embodiment the first phase-inverter 6a may be disposed between the antenna elements 7b and 7c which are the second and third in order from the first end portion, alternatively, the first phase-inverter 6a may be disposed between the antenna element 7a closest to the first end portion and the second-in-order antenna element 7b.

When the substrate 2 is evenly divided into four regions in the longitudinal directions, the second phase-inverter 6b may be disposed in the end region opposite from the first phase-inverter 6a (the region which includes the second end portion). That is, in this embodiment, there may also be disposed a phase-inverter between adjacent antenna elements on the second end portion side of the center of the substrate 2 in the longitudinal directions. Being disposed at a line-symmetrical position to the first phase-inverter 6a, the second phase-inverter 6b may have the same configuration and function as the first phase-inverter 6a, and therefore the description thereof is omitted.

The third phase-inverter 6c may be disposed between the first phase-inverter 6a and the second phase-inverter 6b. In detail, it may be arranged between the antenna elements 7j and 7k which are arranged to be adjacent to each other across the center of the substrate 2 in the longitudinal directions. Since the secondary feeder line 5j and the secondary feeder line 5k feed power in opposite directions, it may be necessary to invert the phase of the radio wave to be transmitted, in order to coincide the radio waves radiated from the antenna elements 7j and 7k. The third phase-inverter 6c may shift the connecting position between the connecting line 3 and the primary feeder line 4 slightly from the center so that the path length to the antenna element 7j differs from the path length to the antenna element 7k by $\lambda/2$.

In this embodiment, since both the antenna elements 7j and 7k disposed on both sides of the third phase-inverter 6c may be fed power from the end sides, the interval between the secondary feeder line 5j and the secondary feeder line 5k may be widened. Therefore, as in Patent Document 2, it may be possible to invert the phase without curving the feeder line. Therefore, the generation of sidelobes may be reduced.

Next, results of simulations performed to confirm the effects of the present disclosure will be described with reference to FIGS. 2 and 3.

Figure 2:
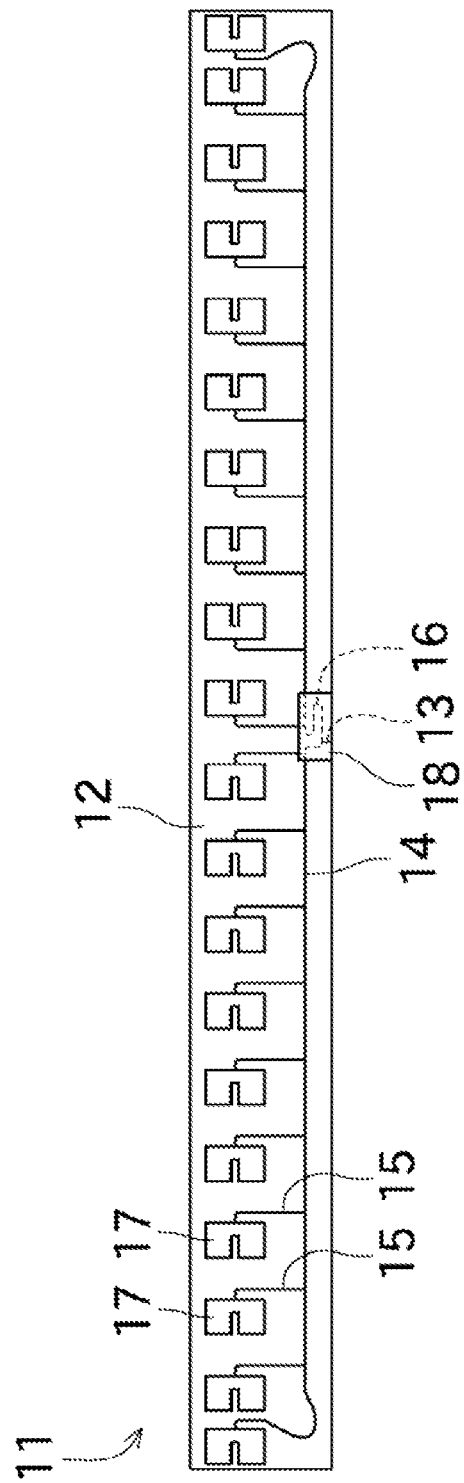
FIG. 2 is an elevational view of an array antenna of a comparative example.

An array antenna 11 of a comparative example illustrated in FIG. 2 has a similar layout as that of Patent Document 2. The array antenna 11 includes a substrate 12, a connecting line 13, a primary feeder line 14, secondary feeder lines 15, a phase-inverter 16, and antenna elements 17. The phase-inverter 16 is disposed at a center of the substrate 12 in its longitudinal directions. As described in the problems, the layout of Patent Document 2 has a narrow interval between the adjacent secondary feeder lines 15 at the center, and therefore the phase-inverter 16 cannot be constructed unless the feeder lines are greatly curved. However, greatly curving the feeder line results in generating sidelobes. In the comparative example, a shielding plate 18, which is a metal plate material, is attached to cover the phase-inverter 16, thereby reducing the generation of sidelobes.

Note that, while it is possible to solve the problems of the present application by attaching the shielding plate 18, it causes an increase in the number of components.

Figure 3:
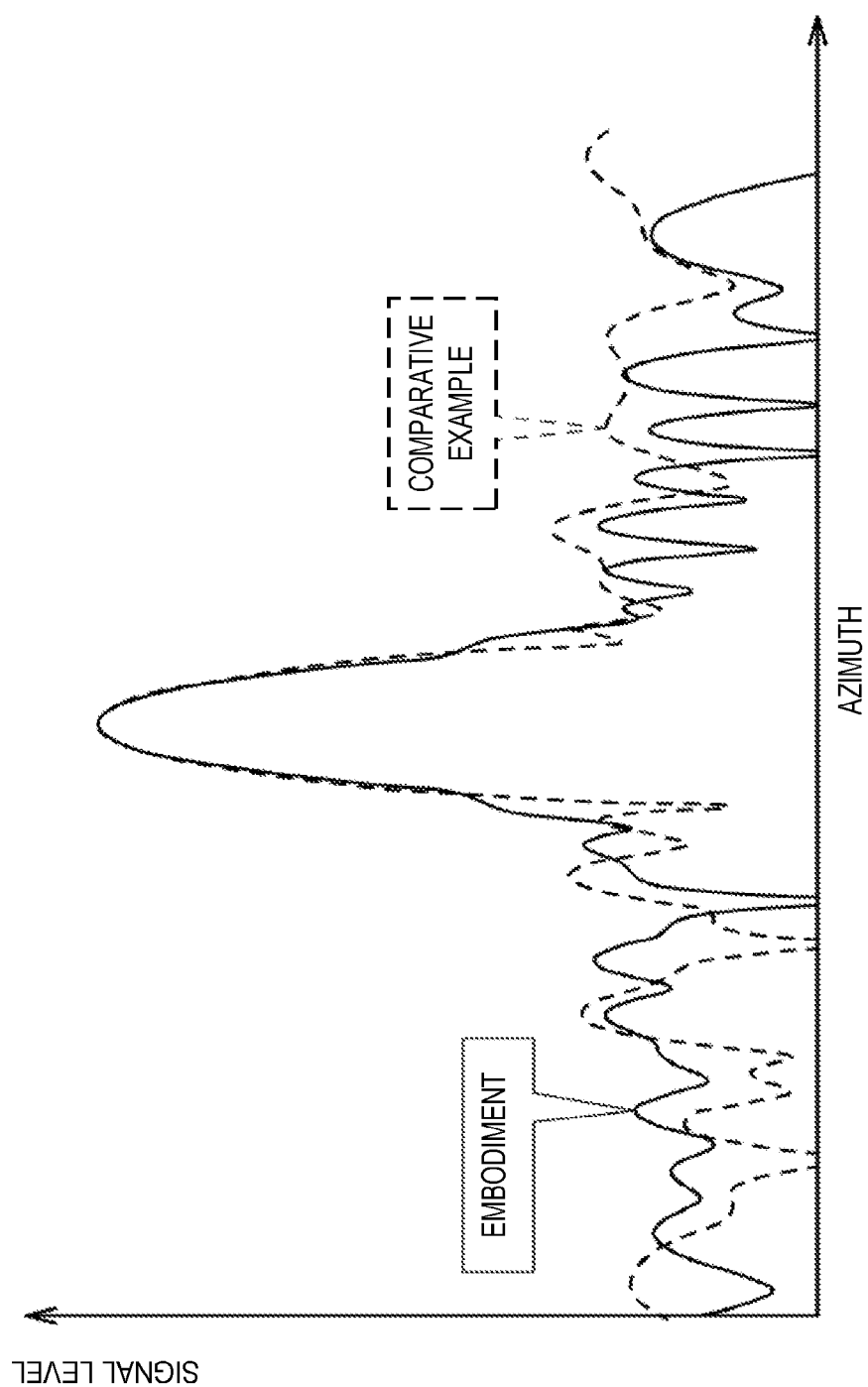
FIG. 3 is a chart illustrating a comparison between radiation patterns of array antennas in this embodiment and the comparative example.

FIG. 3 is a chart illustrating a comparison between radiation patterns of the array antennas in this embodiment and the comparative example. It may be understood from the chart of FIG. 3 that despite the absence of the shielding plate 18 in the array antenna 1 of this embodiment, the generation of sidelobes is reduced similarly to or more than the array antenna 11 having the shielding plate 18.

Figure 4:
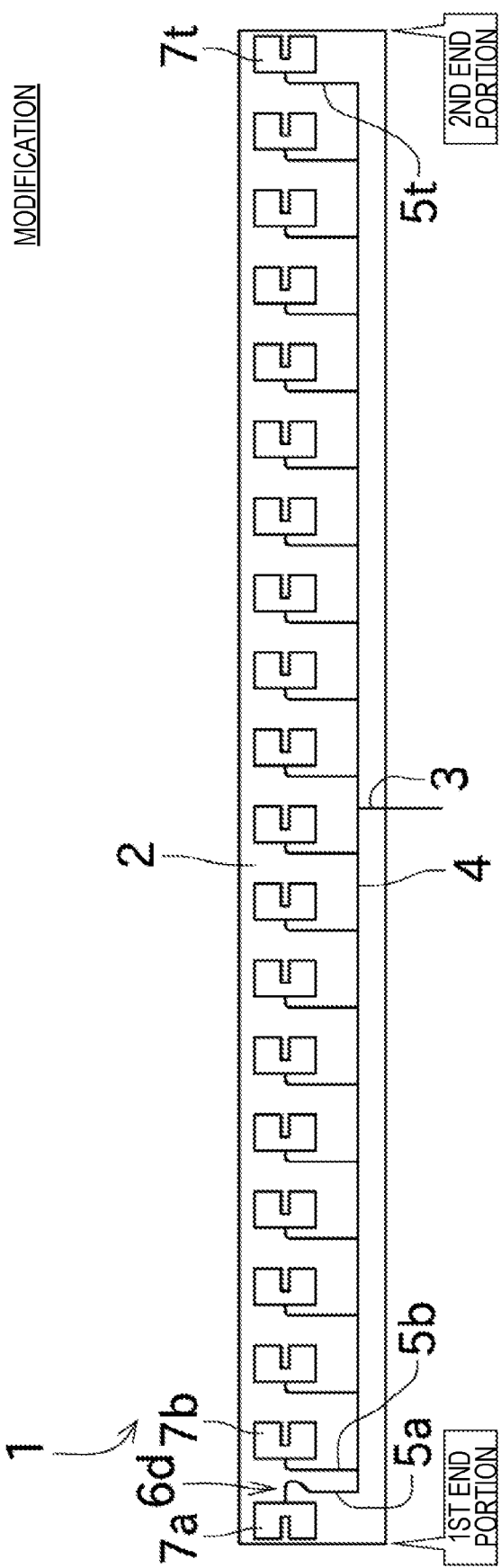
FIG. 4 is an elevational view of an array antenna according to a modification.

Next, a modification of the above embodiment will be described. Note that in the description of this modification, the same reference characters are applied to the same or similar members as those of the above embodiment, and the description thereof may be omitted. FIG. 4 is an elevational view of an array antenna 1 according to the modification.

While three phase-inverters may be arranged in the above embodiment, one phase-inverter may be provided in this modification. Below, this is descried in detail. In the array antenna 1 of the modification, an antenna element 7a disposed closest to a first end portion may be connected with a secondary feeder line 5a from a second end portion side, and other antenna elements 7b to 7t may be connected with secondary feeder lines 5b to 5t from the first end portion side.

Since the secondary feeder line 5a and the secondary feeder line 5b feed power in opposite directions, it may be necessary to invert the phase of the radio wave to be transmitted, in order to coincide the radio waves radiated from the antenna elements 7a and 7b. Therefore, a fourth phase-inverter 6d may be disposed between the antenna elements 7a and 7b. The fourth phase-inverter 6d may be, similar to the first phase-inverter 6a etc., a part where the secondary feeder line 5a is curved to invert the phase.

Note that, the position where the fourth phase-inverter 6d is formed is not limited to the above; however, it may be more preferably to be disposed, when the substrate 2 is evenly divided into four regions in the longitudinal directions, a region including the first end portion or the second end portion.

Since the fourth phase-inverter 6d may be disposed near the end portion of the substrate 2 in the longitudinal directions also in the layout of this modification, the generation of sidelobes may be reduced. Further, no secondary feeder line may be disposed at the end portions of the substrate 2, which may allow the number of antenna element dispositions to be increased.

As described above, the array antenna 1 of this embodiment or the modification may include the substrate 2, the plurality of antenna elements 7a to 7t, the primary feeder line 4, the plurality of secondary feeder lines 5a to 5t, and the phase-inverter 6a (6d). The antenna elements 7a to 7t may be arrayed in the longitudinal directions of the substrate 2. The secondary feeder lines 5a to 5t may be arranged on the substrate 2 so as to branch from the primary feeder line 4 for the respective antenna elements 7a to 7t, connected to the respective antenna elements 7a to 7t from one of the longitudinal directions of the substrate 2, and at least connected to the antenna elements 7a and 7t, which are disposed at the both end portions, from the center side of the substrate 2. The phase-inverter 6a (6d) may be the position where the secondary feeder lines 5b and 5c (5a and 5b) are connected to the antenna elements 7b and 7c (7a and 7b) in different directions, may be disposed between the antenna elements 7b and 7c (7a and 7b) adjacent to each other on the first end portion side of the longitudinal center of the substrate 2, and may invert the phase of the radio wave to be transmitted.

Thus, since no secondary feeder line may be disposed at the end portions of the substrate 2, the number of antenna element dispositions may be increased by effectively utilizing the size of the substrate 2. Further, since the phase-inverter 6a (6d) may be disposed at other than the center, the generation of sidelobes may be reduced.

Although the suitable embodiment and modification of the present disclosure are described above, the above configurations may be modified as follows, for example.

Although in the above embodiment and modification twenty antenna elements 7a to 7t may be disposed on the substrate 2, the number of the antenna elements is arbitrary, and it may be 19 or less, or 21 or more.

In the above embodiment and modification, it is described that when the substrate 2 is evenly divided into the four regions in the longitudinal directions, the first phase-inverter 6a, the second phase-inverter 6b, and the fourth phase-inverter 6d may be disposed in the region including the first end portion or the second end portion. However, they may be disposed in any one of the two central regions as long as they are not disposed across the two central regions. Also with this layout, generation of sidelobes may be reduced compared with Patent Document 2.

The shapes of the substrate 2, the connecting line 3, the primary feeder line 4, the secondary feeder lines 5a to 5t, the phase-inverters 6a to 6d, and the antenna elements 7a to 7t described in the above embodiment and modification are arbitrary and are not limited to those shown above. For example, the antenna elements 7a to 7t may be formed into a substantially circle. Further, two or more connecting lines 3 and two or more primary feeder lines 4 may be disposed on the substrate 2.

Although in the above embodiment the secondary feeder lines 5a to 5t, the phase-inverters 6a and 6b, and the antenna elements 7a to 7t may be disposed line-symmetric with respect to the center of the substrate 2, they may be asymmetric.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about", and "substantially" as used herein include the recited numbers, and also represent an amount close to the stated amount that still performs a desired function or achieves a desired result. For example, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An array antenna of a center feed type, comprising:
   a substrate having a first end portion and a second end portion in a longitudinal direction;

a plurality of antenna elements arrayed on the substrate in the longitudinal direction;

a primary feeder line extending continuously in the longitudinal direction of the substrate;

a plurality of secondary feeder lines arranged on the substrate, each secondary feeder line from the plurality of secondary feeder lines being connected between the primary feeder line and one antenna element from the plurality of antenna elements, a first secondary feeder line connects to an antenna element positioned at the first end portion of the substrate, and a second secondary feeder line connects to an antenna element positioned at the second end portion; and a first phase-inverter configured to invert a phase of a radio wave transmitted to the plurality of antenna elements, the first phase-inverter being positioned between a first pair of adjacent antenna elements connected to respective secondary feeder lines configured to feed the first pair of adjacent antenna elements in opposite directions, the first phase-inverter being off centered in the longitudinal direction.

2. The array antenna of claim 1, wherein when the substrate is evenly divided into four regions in the longitudinal direction, the first phase-inverter is at least positioned in a first end region of the four regions.

3. The array antenna of claim 2, further comprising a second phase-inverter configured to invert a phase of a radio wave transmitted to the plurality of antenna elements, the second phase-inverter being positioned between a second pair of adjacent antenna elements connected to respective secondary feeder lines configured to feed the second pair of adjacent antenna elements in opposite directions, the second phase-inverter being off centered in the longitudinal direction, wherein the second phase-inverter is positioned in a second end region of the four regions different from the first end region.

4. The array antenna of claim 3, comprising a third phase-inverter configured to invert a phase of a radio wave transmitted to the plurality of antenna elements, wherein the third phase-inverter is positioned between the first phase-inverter and the second phase-inverter.

5. The array antenna of claim 4, wherein the third phase-inverter is positioned between a third pair of antenna elements adjacent to each other and positioned across a center of the substrate.

6. The array antenna of claim 4, wherein the third phase-inverter is not curved.

7. The array antenna of claim 1, wherein the secondary feeder lines are symmetric with respect to a line passing through a longitudinal center of the substrate as a symmetrical line.

8. The array antenna of claim 1, wherein the first phase-inverter is positioned between adjacent antenna elements positioned closest to an end of the substrate.

* * * * *